Patented Apr. 10, 1951

2,548,746

UNITED STATES PATENT OFFICE 2,548,746

S-(4-THIAZOLYLMETHYL)-ISOTHIOUREAS

James M. Sprague, Drexel Hill, and Anthony H. Land, Ridley Park, Pa., assignors to Sharp & Dohme, Incorporated, Philadelphia, Pa., a corporation of Maryland No Drawing. Application October 10, 1947, Serial No. 779,211

6 Claims. (Cl. 260—302)

This invention relates to new chemical compounds, namely, the S-(4-thiazolylmethyl)-isothioureas, which may be represented by the formula

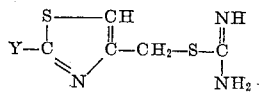

in which Y represents hydrogen, or an alkyl, aralkyl, alicyclic, or aryl group, which may be substituted or unsubstituted, an amino group or substituted amino group, or other substituent for the 2-hydrogen of the thiazole radical.

While in the foregoing formula, the compounds are illustrated in the form of a free base, they are unstable in that form, and as prepared are in the form of their salts, for example, the hydrochlorides. These isothioureas decompose under the influence of alkali or under alkaline conditions to give a mercaptan or mercaptide, and cyanamide.

The new compounds are of value as intermediates for the production of other compounds of varied utility in therapeutic agents, for example, for the production of substituted 4-methyl-thiazoles, in particular, the mercaptans, thioethers, sulfides and disulfides, many of which are of varied effectiveness as anti-thyroid agents.

The new compounds of the invention are readily prepared by the reaction of thiourea with the corresponding chloromethylthiazole, in accordance with the equation

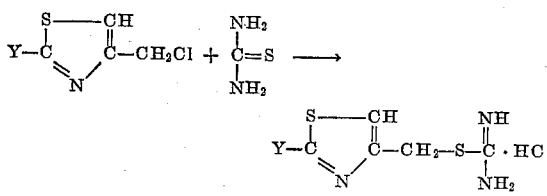

This action results in the production of the products in the form of their hydrochlorides, which are stable, and which can be isolated in crystalline form. Treatment of the isolated products with alkali gives the corresponding mercaptan or mercaptide, which, with oxidizing agents, gives the disulfide, or, with alkylating agents, the corresponding thioethers, or, with unsaturated carbonyl compounds, thioether or sulfide compounds. One or more of the nitrogen linked hydrogens of the isothiourea structure may be replaced by an alkyl, aryl, alicyclic or aralkyl group, as by using a substituted thiourea, e. g., methyl, ethyl, phenyl, benzyl, cyclohexyl, sym. dimethyl or unsym. dimethyl thiourea, or the like; but inasmuch as the compounds are useful as intermediates, mainly for the production of compounds which do not have the isothiourea structure, there is usually little reason for the preparation of such equivalent compounds.

The preparation of the compounds of the invention will be illustrated by the following specific examples, but the invention is not limited thereto.

*Example 1.*—1.8 parts of 2-amino-4-chloromethylthiazole hydrochloride was added to a boiling solution of 0.76 part of thiourea in 16 parts of ethanol. After about 5 minutes a crystalline precipitate began to form, and after refluxing for one hour the mixture was cooled and filtered. A white crystalline product melting at 255° C. with decomposition was obtained. On recrystallization from a mixture of acetone and dilute hydrochloric acid a crystalline product melting at 254–255° C. with decomposition was obtained. This product was S-(2-amino-4-thiazolylmethyl)-isothiourea dihydrochloride.

This same product may also be prepared directly from thiourea and alpha,gamma-dichloroacetone without isolation of the intermediate 2-amino-4-chloromethylthiazole, although it is probable that the reaction proceeds with the formation of 2-amino-4-chloromethylthiazole as an intermediate. For this method of preparation, 76 parts of thiourea were added to a solution of 63.5 parts of alpha,gamma-dichloroacetone in 400 parts of ethanol, and the mixture was warmed on a steam bath until the exothermic reaction started. Crystallization began after several minutes. The mixture was cooled in an ice bath, filtered, the crystals washed with acetone and dried at 70° C. The product melted at 249–250° C. with decomposition.

This product is sparingly soluble in cold ethanol, gives a white precipitate with cold aqueous silver nitrate that is unchanged after heating to boiling, gives a purple color in the diazotization test, and in solution in dilute sodium hydroxide gives a violet color with sodium nitroprusside.

*Example 2.*—4.7 parts of 2-methyl-4-chloromethylthiazole, dissolved in 12 parts of ethanol were added to a solution of 2.45 parts of thiourea in 60 parts of warm ethanol, and the mixture was refluxed for 2 hours. The ethanol was then evaporated and the viscous liquid residue cooled and stirred until it crystallized. Crystallization from a mixture of ethyl and isopropyl alcohols containing a few drops of concentrated hydrochloric acid gave a product in the form of white crystals, M. P. 178–179° C. Recrystallization raised the melting point to 179-179.5° C. This product is S-(2-methyl-4-thiazolylmethyl)-isothiourea hydrochloride.

*Example 3.*—3.15 parts of 2-phenyl-4-chloromethylthiazole and 1.14 parts of thiourea in 20 parts of ethanol were heated to boiling until the reactants dissolved and was then allowed to cool to room temperature. After 2 hours the alcohol was evaporated and the residue was cooled and stirred until it crystallized. The crude product was washed with acetone and dried, giving a crystalline product, M. P. 201-2° C. After two crystallizations from a mixture of ethyl and isopropyl alcohol containing a few drops of concentrated hydrochloric acid, the product had a melting point of 200.5-202° C. It was S-(2-phenyl-4-thiazolylmethyl)-isothiourea hydrochloride.

Other of the compounds included within the invention, and which may be prepared by the method of the foregoing examples, are S-(2-p-methoxyphenyl-4-thiazolylmethyl) - isothiourea, prepared in the same way from 2-p-methoxyphenyl - 4 - chloromethylthiazole; S-[2-(3,4 - dimethoxyphenyl) - 4 - thiazolylmethyl] - isothiourea, prepared from 2-(3,4-dimethoxyphenyl) - 4 - chloromethylthiazole; S-[2-(3,4-methylenedioxyphenyl)-4-thiazolylmethyl]-isothiourea, prepared from 2 - (3,4 - methylenedioxyphenyl) - 4 - chloromethylthiazole; S-(2-phthalimidomethyl-4-thiazolylmethyl)-isothiourea, prepared from 2-phthalimido - 4 - chloromethylthiazole; S - (2-methylamino - 4 - thiazolylmethyl) - isothiourea, prepared from 2-methylamino-4-chloromethylthiazole; S-(2 - acetylamino-4-thiazolylmethyl)-isothiourea, prepared from 2-acetylamino-4-chloromethylthiazole. All of these compounds, in the form of their hydrochlorides, which is the form in which they are produced by the illustrated process, are crystalline materials, useful as intermediates for the preparation of corresponding mercaptans, sulfides, thioethers, etc.

We claim:

1. Compounds of the formula

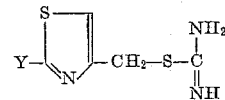

in which Y is a member of the group selected from alkyl, aryl and amino radicals.

2. S-(2-amino-4-thiazolylmethyl)-isothiourea.
3. S-(2 - alkyl-4-thiazolylmethyl)-isothiourea.
4. S-(2-methyl - 4 - thiazolylmethyl) - isothiourea.
5. S-(2-aryl - 4 - thiazolylmethyl)-isothiourea.
6. S-(2 - phenyl - 4 - thiazolylmethyl) - isothiourea.

JAMES M. SPRAGUE.
ANTHONY H. LAND.

REFERENCES CITED

The following references are of record in the file of this patent:

Land et al.: J. Am. Chem. Soc., vol. 68, pp. 2155-2159 (1946).